(12) United States Patent
Carini et al.

(10) Patent No.: US 12,264,983 B2
(45) Date of Patent: Apr. 1, 2025

(54) BRACELET SENSING ARRAY

(71) Applicant: Simmonds Precision Products, Inc., Vergennes, VT (US)

(72) Inventors: Peter J. Carini, Williston, VT (US); Eric DeWind, Richmond, VT (US); Nathan Palmer, Williston, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 413 days.

(21) Appl. No.: 17/829,068

(22) Filed: May 31, 2022

(65) Prior Publication Data
US 2023/0408350 A1 Dec. 21, 2023

(51) Int. Cl.
*G01L 1/24* (2006.01)
*G01K 11/3206* (2021.01)

(52) U.S. Cl.
CPC .......... *G01L 1/246* (2013.01); *G01K 11/3206* (2013.01); *G01L 1/247* (2013.01)

(58) Field of Classification Search
CPC ......... G01L 1/246; G01L 1/247; G01L 1/205; G01L 5/00; G01K 11/3206
See application file for complete search history.

(56) References Cited

U.S. PATENT DOCUMENTS

| | | | | |
|---|---|---|---|---|
| 4,651,074 A * | 3/1987 | Wise | ............. | G01L 5/228 250/227.24 |
| 5,182,449 A * | 1/1993 | Johnson | ............. | G01L 1/247 250/227.14 |
| 6,204,920 B1 * | 3/2001 | Ellerbrock | ............. | G01L 1/246 356/477 |
| 6,816,266 B2 * | 11/2004 | Varshneya | ............. | A61B 5/6887 356/477 |
| 7,154,081 B1 * | 12/2006 | Friedersdorf | ............. | G01M 11/086 250/227.16 |
| 7,520,176 B1 * | 4/2009 | Ko | ............. | G01M 5/0016 73/800 |
| 7,538,860 B2 * | 5/2009 | Moore | ............. | G02B 6/02076 356/478 |
| 7,646,945 B2 * | 1/2010 | Jones | ............. | G01L 1/246 385/12 |
| 8,009,946 B2 * | 8/2011 | Xia | ............. | A61B 5/6833 385/13 |
| 8,547,539 B2 * | 10/2013 | Ramos | ............. | G01M 5/0025 356/73.1 |
| 8,909,040 B1 * | 12/2014 | Parker, Jr. | ............. | G02B 6/35 398/87 |

(Continued)

OTHER PUBLICATIONS

Extended European Search Report issued by the European Patent Office, dated Oct. 17, 2023, in corresponding European Patent Application No. 23176391.3.

*Primary Examiner* — Freddie Kirkland, III
(74) *Attorney, Agent, or Firm* — Kinney & Lange, P.A.

(57) ABSTRACT

In accordance with at least one aspect of this disclosure, a sensing system includes a sensor mat configured to conform to a component having a central axis, a first sensor cluster disposed on or in the sensor mat configured to sense one or more conditions at a first location on the component, and a second sensor cluster disposed on or in the sensor mat configured to sense one or more conditions at a second location circumferentially spaced to the first location. In embodiments, the second location can be diametrically opposed to the first location.

20 Claims, 7 Drawing Sheets

(56) References Cited

U.S. PATENT DOCUMENTS

| | | | | |
|---|---|---|---|---|
| 9,032,810 | B2* | 5/2015 | Ravet | G01B 11/16 |
| | | | | 73/800 |
| 9,064,357 | B1* | 6/2015 | McCormick | B64D 45/00 |
| 10,024,756 | B2* | 7/2018 | Da Silva | G01M 5/0033 |
| 10,209,060 | B1* | 2/2019 | Nguyen | G01B 11/18 |
| 10,488,183 | B1* | 11/2019 | Wolf | G01L 1/246 |
| 10,584,982 | B2* | 3/2020 | Handerek | G01K 11/32 |
| 10,749,612 | B1 | 8/2020 | Iannotti | |
| 11,298,505 | B2* | 4/2022 | Bailey | A61B 1/009 |
| 2003/0173958 | A1 | 9/2003 | Goldfine et al. | |
| 2009/0217769 | A1* | 9/2009 | Roberts | G01M 5/0041 |
| | | | | 73/800 |
| 2015/0086206 | A1* | 3/2015 | Goldner | G01D 5/35387 |
| | | | | 398/83 |
| 2019/0269885 | A1* | 9/2019 | Bailey | A61B 17/00234 |
| 2022/0049997 | A1 | 2/2022 | Katsuhara et al. | |
| 2023/0003511 | A1* | 1/2023 | Tanju | G01M 5/0091 |

\* cited by examiner

BRACELET SENSING ARRAY

TECHNICAL FIELD

The present disclosure relates to sensing array, and more particularly to conformal sensing arrays (e.g., for aircraft).

BACKGROUND

Typical sensing arrays for aircraft components include a number of sensors measuring forces on the component. However, force vector resolution and subsequent loading on aircraft components without modification to structure is not currently available with conventional sensing systems. Moreover, sensing systems that are reliable and easier to install are needed in the art. This disclosure provides a solution for these needs.

SUMMARY

In accordance with at least one aspect of this disclosure, a sensor mat includes, a plurality of sensors disposed therein or thereon at predetermined locations configured to sense one or more forces acting on a component to which the sensor mat is configured to attach. The predetermined locations of the sensors is based on a geometry of the component to which the sensor mat is configured to attach.

In embodiments, the plurality of sensors can be arranged in two or more sensor clusters. In embodiments, the two or more sensor clusters can be arranged in complimentary pairs relative to one another. In embodiments, the complementary pairs of sensor clusters can be arranged 90 degrees apart from one another in the circumferential direction when the sensor mat is attached to the component. In embodiments, at least one sensor can be axially aligned with a horizontal axis of the sensor mat, at least one sensor can be oblique to a horizontal axis of the sensor mat, and at least one sensor of each cluster can be parallel to at least one sensor from a different cluster.

In embodiments, the sensors can be configured to sense one or more of shear strain, normal strain, and/or temperature. In certain embodiments, the plurality of sensors can include Fiber-Bragg Grating sensors. In certain embodiments, the plurality of sensors can include foil strain sensors. In certain embodiments, the plurality of sensors can include carbon nanotube strain sensors.

In certain embodiments, the sensor mat can include a first substrate configured to attach to the component, and the plurality of sensors can be disposed on or in the first substrate. The sensor mat can also include a second substrate and a third substrate configured to sandwich the first substrate. In certain embodiments, the third substrate may be omitted.

In accordance with at least one aspect of this disclosure, a system can include a load bearing component and a sensor array conformally attached to the component. In embodiments, the sensor array can include a plurality of sensors disposed within a substrate at predetermined locations configured to sense one or more forces placed upon the component. In certain embodiments, the sensor array can include the sensor mat described above.

In embodiments, the plurality of sensors can be arranged in two or more sensor clusters and the two or more sensor clusters can be arranged in complimentary pairs relative to one another such that the complimentary pairs are diametrically opposed. In certain embodiments, the two or more sensor clusters can be distributed circumferentially about a central axis of the component such that the complimentary pairs are diametrically opposed. In embodiments, at least one sensor of each complimentary pair can be axially aligned with a central axis of the component and a first sensor cluster of the complimentary pair can be spaced 180 degrees from a second cluster of the complimentary pair in the circumferential direction. In embodiments, at least one sensor of each complimentary pair can be obliquely offset from a central axis of the component and a first sensor cluster of the complimentary pair is spaced 90 degrees from a second cluster of the complimentary pair in the circumferential direction.

In certain embodiments, the load bearing component can include an aircraft landing gear component. In certain embodiments, the landing gear component can include one or more of a shock, a strut, rod, beam and/or support column. In certain embodiments, the load bearing component can be symmetrical about at least a longitudinal axis of the load bearing component.

In accordance with at least one aspect of this disclosure, a method for installing a sensing system can include applying a prearranged sensor array conformally around a load bearing component such that two sensor clusters of the sensor array are circumferentially spaced from one another about a central axis of the component. In embodiments, the prearranged sensor array can be the same, similar to, or can include the sensor mat or the sensing array as described above, or any suitable combination thereof.

In embodiments, applying the prearranged sensor array can include applying the prearranged sensor array via a transfer sheet, and in certain embodiments, the method can include removing the transfer sheet such that the sensor array remains attached to the component in its prearranged arrangement.

In accordance with at least one aspect of this disclosure, a sensing system includes a sensor mat configured to conform to a component having a central axis, a first sensor cluster disposed on or in the sensor mat configured to sense one or more conditions at a first location on the component, and a second sensor cluster disposed on or in the sensor mat configured to sense one or more conditions at a second location circumferentially spaced to the first location. In embodiments, the second location can be diametrically opposed to the first location.

At least one sensor can be axially aligned with the central axis configured to sense normal strain on the component at the respective location. At least one sensor can be obliquely offset from the central axis to sense shear strain on the component at the respective location. One or more sensors may be included to sense a temperature of the component. In embodiments, one sensor from each cluster can be axially aligned with the central axis and one sensor from each cluster can be obliquely offset from the central axis.

In embodiments, a third sensor cluster can be disposed on or in the sensor mat configured to sense one or more conditions at a third location on the component, and fourth sensor cluster disposed on or in the sensor mat configured to sense one or more conditions at a fourth location circumferentially spaced from the third location. In embodiments, the fourth location can be diametrically opposed to the third location.

A fifth sensor cluster can be disposed on or in the sensor mat configured to sense one or more conditions at a fifth location. The sensor mat can be configured to conform to an outer circumference of the component about the central axis, where the fifth location can represent 0 degrees on the circumference of the component, the first location can be at 180 degrees relative to the fifth location, the second location can be at −180 degrees relative to the fifth location, the third location can be at 90 degrees relative to the fifth location and the fourth location can be at −90 degrees relative to the fifth location.

In certain embodiments the sensor mat can include a flexible substrate wherein the sensors are disposed in the flexible substrate. In certain embodiments, the sensor mat can include a flexible substrate wherein the sensors are disposed on or in the flexible substrate. In certain embodiments, the flexible substrate can be configured to remain attached to the component during use. In certain embodiments, the flexible substrate can be configured as a transfer sheet such that after conforming to the component, the flexible substrate is configured to be removed from the component but leaving the first and second sensor clusters remain attached to the component. In embodiments, the flexible substrate can include one or more of, AL, Kevlar, rubber, and/or fiberglass.

In embodiments, the system can also include a module operatively connected to the first and second clusters configured to receive signals indicative of the one or more conditions at the first and second locations, resolve condition vectors for each of the signals indicative of the one or more conditions at the first and second locations, and output a value to determine one or more of load on the component and/or calculate a center of gravity of a system to which the component is attached.

In embodiments, each of the sensor clusters can be operatively connected to the module via optical fibers, where the sensors of the sensor clusters include fiber-Bragg grating sensors. A fiber sheath can operatively connect between the sensor mat and the module configured to enclose or protect the optical fibers. In embodiments, the flexible substrate and the fiber sheath can be of a material configured to support and protect the optical fibers while allowing for adequate flexibility for conforming the sensor mat to the component and movement of the sheath between the sensor mat and the module.

In embodiments, the first sensor cluster, the second sensor cluster and the fifth sensor cluster can each include a temperature sensor, a normal strain sensor is axially aligned with the central axis and axially spaced from the temperature sensor, and a shear strain sensor obliquely offset from the central axis and oblique to the normal strain sensor. The third sensor cluster and the fourth sensor cluster can each include a normal strain sensor is axially aligned with the central axis and a shear strain sensor obliquely offset from the central axis and oblique to the to the normal strain sensor.

In accordance with at least one aspect of this disclosure, a system can include, an aircraft landing gear having a component, a sensor array conformally attached to the component of the landing gear. The sensor array can include a first sensor cluster configured to sense one or more conditions at a first location on the component, a second sensor cluster configured to sense one or more conditions at a second location circumferentially spaced from the first location. In embodiments the sensor array conformally attached to the component can include any embodiment of sensor array as described herein, and/or any suitable combination of embodiments. The landing gear component includes one or more of a shock, a strut. In certain embodiments, the component need not be a landing gear component. Any component having a symmetrical profile that experiences loads can utilize the sensing system described herein, for example an I-beam.

In accordance with at least one aspect of this disclosure, a method for installing a sensor system (e.g., as described above), can include applying a prearranged sensor array conformally around a component of an aircraft such that two sensor clusters of the sensor array are circumferentially spaced from one another about a central axis of the component. In certain embodiments, applying the prearranged sensor array can include applying the prearranged sensor array via a transfer sheet, the method further including removing the transfer sheet such that the sensor array remains attached to the component in its prearranged arrangement.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
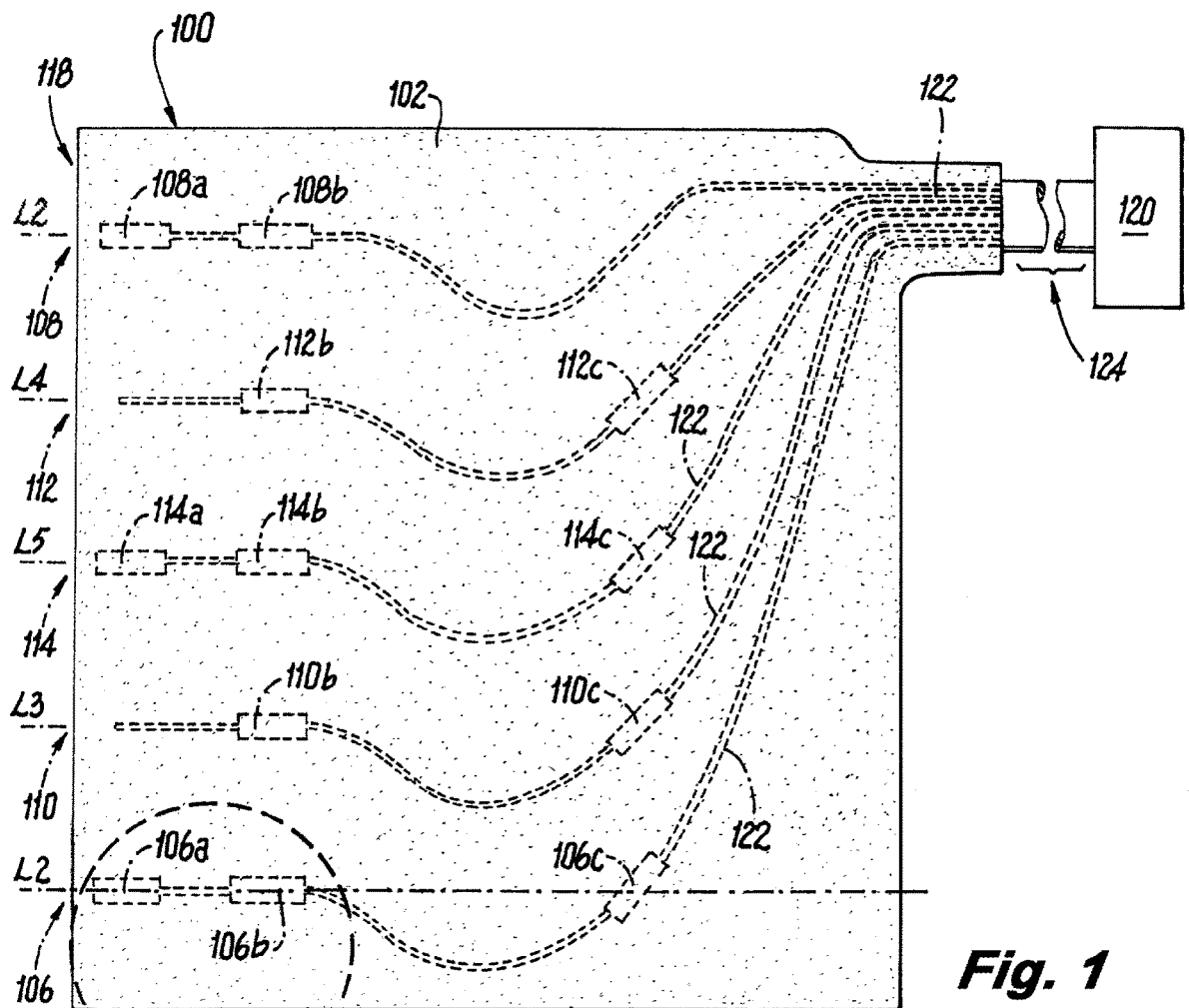
FIG. 1 is a schematic plan view of a system in accordance with this disclosure, showing a sensor mat having one or more sensor clusters therein or thereon.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-11. Certain embodiments described herein can be used to sense a strain which can be used to calculate a load on a component.

In accordance with at least one aspect of this disclosure, a system 100 can include a sensor mat 102 configured to attach (e.g., conformally) to a load bearing component 104, the component having a central axis A. The sensor mat 102 can include a plurality of sensors 106, 108, 110, 112, 114 disposed therein or thereon at predetermined locations L1-L5 configured to sense one or more forces acting on the component 104 to which the sensor mat 102 is configured to attach. The predetermined locations L1-L5 of the sensors 106 can be based on a geometry of the component 104 to which the sensor mat is configured to attach. For example, embodiments shown herein are shown configured to attach to a cylindrical load bearing component 104, however embodiments can be suitable for any load bearing component having at least an axis of symmetry common with the central axis A.

In embodiments, the plurality of sensors can be arranged in two or more sensor clusters 106, 108, 110, 112, 114, each cluster comprising at least two sensors. As used herein, a "cluster" can include a number of sensors arranged at a predetermined location and in a specific relation relative to sensors outside of the defined cluster. Within each cluster, each sensor can have the same interrelation within the sensor mat 102, for example each sensor within the cluster can be in line, though the sensors may be at different angles oriented relative to a central axis A. Each cluster can also be located at one of the predetermined locations L1-L5. For example, the sensor cluster 106 can include sensors 106a, 106b, and 106c all in line at L1, the sensor cluster 108 can include sensors 108a and 108b in line at L2, and so on. In embodiments, as shown, the two or more sensor clusters 106, 108, 110, 112, 114 can be arranged in complimentary pairs relative to one another. More specifically, a complimentary pair can include two sensor clusters arranged 180 degrees apart from one another, such as cluster 106 and 112 at L1 and L4 as shown in FIG. 1. Another complimentary pair could include cluster 110 and 108 at L2 and L3 as shown in FIG. 1.

At least one sensor of the sensor mat 102 can be axially aligned with a central axis of the sensor mat 102 and at least one sensor of the sensor mat 102 can be oblique to a horizontal axis of the sensor mat 102, for example as shown with reference to cluster 106. In certain embodiments, this can be true with respect to one sensor of each cluster. In embodiments, at least one sensor of each cluster can be parallel to at least one sensor from a different cluster. For example, sensors 106b, 108b, 110b, and 112b can all be parallel.

In embodiments, the sensors 106, 108, 110, 112, 114 can be configured to sense one or more of shear strain, normal strain, and/or temperature. In embodiments, the sensors 106, 108, 110, 112, 114 can be positioned in the predetermined locations to sense different characteristics. For example, sensors that are axially aligned with the horizontal axis can be configured to sense normal strain, while sensors positioned oblique to the central axis A can be configured to sense shear strain. The sensors configured to sense a temperature of the component can be positioned anywhere suitable within the sensor mat 102, for example at an axial terminal edge of the sensor mat 102.

In certain embodiments, the plurality of sensors 106, 108, 110, 112, 114 can include Fiber-Bragg Grating sensors, foil strain sensors, and or can include carbon nanotube strain sensors, which will be discussed further below. The particular arrangement of the sensors 106, 108, 110, 112, 114 within the sensor mat 102 can be dictated by the type of sensor used. FIGS. 1-9 are described with respect to Fiber-Bragg Grating sensors, while FIGS. 10 and 11 with be described with respect to foil or carbon nanotube sensors.

Figure 1A:
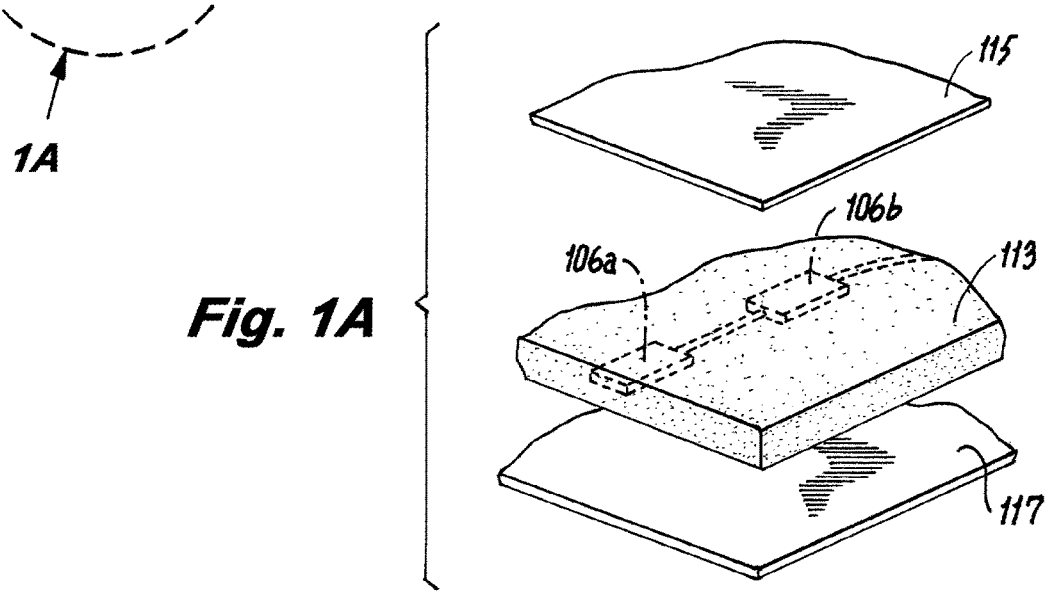
FIG. 1A is an enlarged partial view of the sensor mat of FIG. 1 showing layers of the sensor mat.

In certain embodiments, as shown in FIG. 1A the sensor mat 102 can include a first substrate 113 configured to conformally attach to the component 104, and the plurality of sensors 106, 108, 110, 112, 114 can be disposed on or in the first substrate 113. The sensor mat 102 can also include a second substrate 115 and a third substrate 117, wherein the second and third substrates 115, 117 are configured to sandwich the first substrate 113. In certain embodiments, the third substrate 117 may be omitted, for example if using a transfer sheet as described in further detail below.

In accordance with at least one aspect of this disclosure, the system 100 can include the load bearing component having a sensor array 202 (e.g., the sensor mat 102) conformally attached thereto. As shown, the sensors 106, 108, 110, 112, 114 can be redistributed in the sensor array 202 before conforming to the component 104 such that when the sensor array 202 is attached to the component the sensors 104, 106, 108, 110, 112, 114 distributed circumferentially about a central axis A of the component 104. In embodiments, this allows for the complimentary pairs to be diametrically opposed across the component 104.

In certain embodiments, the load bearing component 104 can include an aircraft landing gear component, for example one or more of a shock, a strut, rod, beam and/or support column, however embodiments can be suitable for any load bearing component, for example structural supports in both stationary and moving structures (e.g., vehicles).

In accordance with at least one aspect of this disclosure, a method for installing a sensing system (e.g., the sensing system 100) can include applying a prearranged sensor array (e.g., sensing array 202) conformally around a load bearing component (e.g., component 104) such that two sensor clusters (e.g., 106, 108, 110, 112, 114) of the sensor array are circumferentially spaced from one another about a central axis A of the component. In embodiments, the prearranged sensor array can be the same, similar to, or can include the sensor mat 102 or the sensing array 202 as described above, or any suitable combination thereof.

In embodiments, applying the prearranged sensor array can include applying the prearranged sensor array via a transfer sheet. Using a transfer sheet, the prearranged sensing array can include the first substrate 113 and the second substrate 115. Once the first substrate 113 is attached to the component 104, the second substrate 115 may be removed, leaving only the first substrate 113 on the component. In this instance, it may be beneficial that the sensors 106, 108, 110, 112, 114 be disposed within the first substrate for added protection. Thus, the method can include removing the transfer sheet such that the sensor array remains attached to the component in its prearranged arrangement. Otherwise, the third substrate 117 can be the substrate to physically attach the remainder of the sensing array 202 to the component, and all three substrates 113, 115, and 117 may remain attached to the component 104. Here, because the second substrate remains attached to the sensing array 202 after installing, the sensors 106, 108, 110, 112, 114 can be disposed on the first substrate.

Still with reference to FIGS. 1-4, the first sensor cluster 106 can be disposed on or in the sensor mat 102 configured to sense one or more conditions at a first location L1 on the component 104, and the second sensor cluster 108 disposed on or in the sensor mat 102 configured to sense one or more conditions at a second location L2 circumferentially spaced to the first location L1. A third sensor cluster 110 can be disposed on or in the sensor mat 102 configured to sense one or more conditions at a third location L3 on the component 104, and fourth sensor cluster 112 can be disposed on or in the sensor mat 102 configured to sense one or more conditions at a fourth location L4 circumferentially spaced from the third location L3. A fifth sensor cluster 114 can be disposed on or in the sensor mat 102 configured to sense one or more conditions at a fifth location L5. In embodiments such as shown in FIGS. 1-4, the first location L1 and the second location L2 can be diametrically opposed from the fifth location L5, where the first location L1 and the second location L2 are circumferentially spaced from the fifth location L5 by 180 degrees. The third location L3 and the fourth location L4 can be diametrically opposed, where third location L3 and the fourth location L4 are separated from one another by 180 degreed, but are placed only 90 degrees separated from each of the fifth location L5, where the first location L1 and the second location L2. The third location L3 can be at a midpoint between the first location L1 and the fifth location L5, and the fourth location L4 can be at a midpoint between the second location L2 and the fifth location L5.

In embodiments, one sensor 106a, 108a, 114a of each of the sensor clusters 106, 108, 114 can be affixed at an end 118 of the cluster to sense a temperature of the component 104 at the respective location L1, L2, L5. One sensor 106b, 108b, 110b, 112b, 114b of each of the sensor clusters 106, 108, 110, 112 114 can be axially aligned with the central axis A to sense normal strain on the component 104 at the respective location L1, L2, L3, L4, L5 due to axial and bending loads, for example normal strain resulting from tensile stress derived from relative displacements that are measured perpendicular to two reference planes. One sensor 106c, 110c, 112c, 114c of each of the sensor clusters 106, 110, 112, 114 can be obliquely offset from the central axis A and the normal strain sensor 106b, 110b, 112b, 114b to sense shear strain on the component 104 at the respective locations L1, L3, L4, L5 due to shear and torsional loads. In embodiments, it may be beneficial to ensure that when the sensor mat 102 is on the component 104, the oblique sensors 106b, 110b are spaced 90 degrees apart from one another when viewed axially, and the same for sensors 112b, 114b. An oblique sensor 108c is not shown in the Figures to illustrate that the normal and shear sensors may be decoupled if needed.

The sensor mat 102 can be configured to conform to an outer circumference 119 of the component 104 about the central axis A, where the fifth location L5 can represent 0 degrees on the circumference 119 of the component 104. The first location L1 can be at 180 degrees relative to the fifth location L5, the second location L2 can be at −80 degrees relative to the fifth location L5, the third location L3 can be at 90 degrees relative to the fifth location L5 and the fourth location L4 can be at −90 degrees relative to the fifth location L5. The sensor clusters 106, 108, 110, 112, 114 can be disposed on or in the mat 102 in the prearranged configuration as described herein above, eliminating the need for an installer to measure and carefully align each of the sensors relative to one another within each cluster, or align the clusters relative to one another about the axis A.

In certain embodiments, as shown in FIGS. 1-1A, the sensor mat 102 can include a flexible substrate, for example first substrate 113, and the sensors can be disposed on the flexible substrate 113 and can further include the second substrate 115 to provide additional protection atop the substrate 113. The third substrate 117 can be the substrate which actually contacts the component 104. Here, the flexible substrates 113, 115, 117 can all be configured to remain attached to the component 104 during use. For example, once the sensor mat 102 is conformally attached to the component 104, no layers of the flexible substrates 113, 115, 117 are removed.

Figure 2:
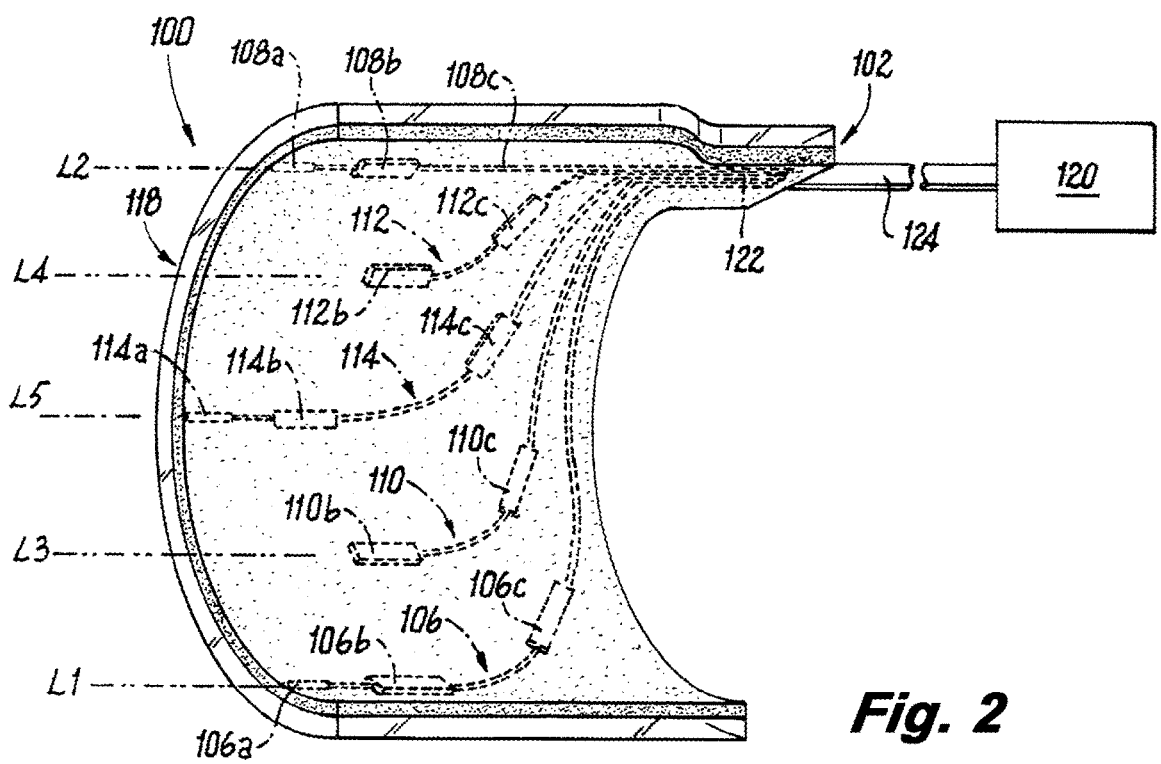
FIG. 2 is a schematic perspective view of the system of FIG. 1, showing the sensor mat holding a conformal shape.
Figure 3:
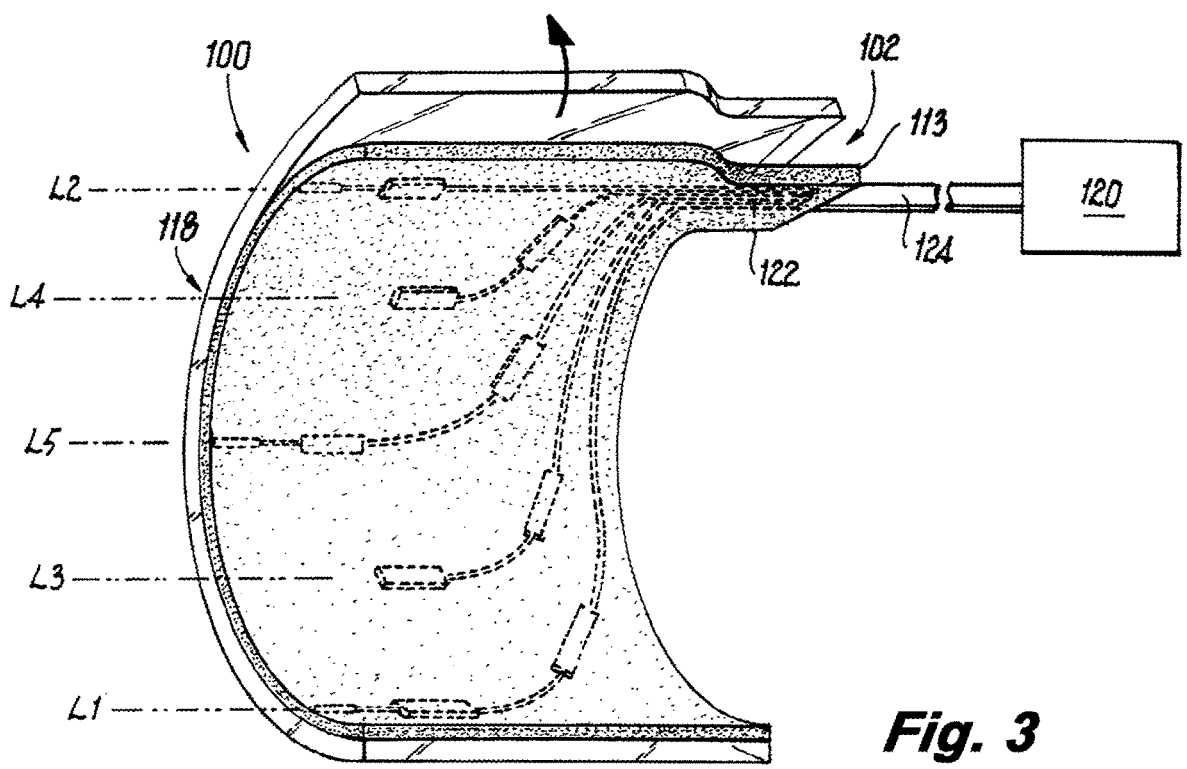
FIG. 3 is a schematic perspective view of the system of FIG. 1, showing the sensor mat holding a conformal shape and a top layer of the sensor mat being removed.
Figure 4:
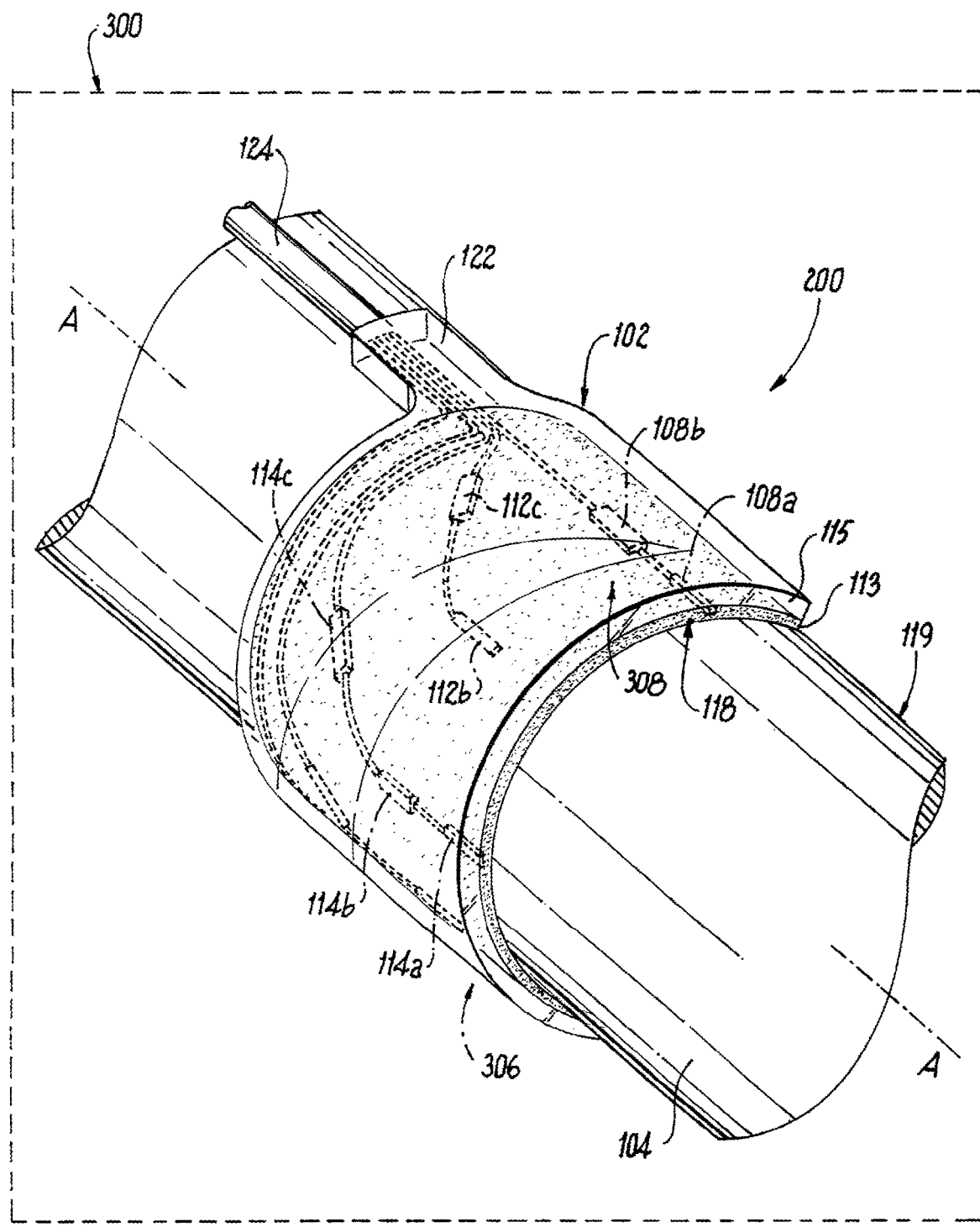
FIG. 4 is a perspective view of the system of FIG. 1, showing the sensor mat conformally attached to a component.

In certain embodiments, as shown in FIGS. 2-4, the sensor mat 102 can include a flexible substrate 113 wherein the sensors are disposed in the flexible substrate 113. Here, the first substrate 113 is in contact with the component 104, and the sensors can be placed on an outward facing surface of the substrate 113. The second substrate 115 is then included atop the first substrate 113 to offer protection for the sensors. Here, the second substrate 115 be configured as a transfer sheet and the third substrate 117 can be omitted. In this case, after conforming the sensor mat 102 to the component 104, the first substrate is configured to be removed from the component 104 but leaving the first substrate 113 attached to the component 104. Thus, in use, the sensor mat 102 includes only the first substrate 113 having the sensors therein, and substrates 115, 117 are not included on the component 104.

In embodiments, the system 100 can also include a module 120 operatively connected to the second clusters 106, 108, 110, 112, 114 configured to receive signals indicative of the one or more conditions at the locations L1-L5, resolve condition vectors for each of the signals indicative of the one or more conditions at the respective locations L1-L5, and output a value to determine one or more of load on the component 104 and/or calculate a center of gravity of the system in which the component 104 is included (e.g., a center of gravity of a vehicle). These calculated values can then be used to determine a health of the component 104, for example.

In embodiments, each of the sensor clusters 106, 108, 110, 112, 114 can be operatively connected to the module 120 via optical fibers 122, for example when the sensors 106, 108, 110, 112, 114 include fiber-Bragg grating sensors. A fiber sheath 124 can operatively connect between the sensor mat 102 and the module 120 configured to enclose and protect the optical fibers 122. In embodiments, the flexible substrates 113, 115, 117 and the fiber sheath 124 can be of a material configured to support and protect the optical fibers 122 while still allowing for adequate flexibility for conforming the sensor mat 102 to the component 104 and allowing for movement of the sheath 124 with movement of the component 104. As shown, in embodiments, an ingress/egress of the optical fibers 122 and the sheath/connector 124 can be located on an opposite side of the terminal edge 118 of the sensor mat 102.

In embodiments, the flexible substrates 113, 115, 117 can include one or more of, AL, Kevlar, rubber, and/or fiberglass. More specifically, the first substrate 113 can be used as a layout guide, template or trenches to facilitate sensor deposition, provide reinforcement, structure or protection from top substrate. The material of the first substrate 113 can include prepreg, carbon fiber, fiberglass, rubber, polyethylene foam, or other flexible substrates capable of facilitating routing or providing internal protection to the sensors and wiring/fiber. In certain embodiments, the first substrate 113 may be combined with the substrates 115, 117 or may be eliminated entirely if a routing/layout aide is not needed, for example. The second substrate 115, can include any suitable material to protect the sensors from damage caused from the external environment. For example, the second substrate 115 material, can include prepreg, carbon fiber, fiberglass, rubber, Aluminum or other flexible substrate capable of protecting the sensors and wiring/fiber. In embodiments, it may may be desirable for the second substrate 115 to overlap or encapsulate the first substrate 113 to provide improve protection of the sensors within the sensing array 202.

The third substrate 117 can include a base material acting as flexible intermediary to physically couple sensor array 202 to the component 104 such that the sensors assume the stiffness of the component 104 when affixed. The material of the third substrate 117 can include prepreg, carbon fiber, fiberglass, Aluminum or other flexible substrate capable of securing the planar arrangement of the sensors while allowing conformance to the component 104. It may be desirable to keep the third substrate 117 relatively thin to facilitate coupling to the component when it is required by the sensor type (e.g., strain).

In accordance with at least one aspect of this disclosure, as shown in FIG. 4, a system 200 can include a portion of a structure 226 (e.g., an aircraft landing gear) having a component 104, a sensor array 300 conformally attached to the component 104 of the landing gear 226. The sensor array 300 can include a first sensor cluster 306 configured to sense one or more conditions at a first location L1 on the component 104 (which is not visible in FIG. 3 due to being behind the component 104, and is indicated by the dashed line), a second sensor cluster 308 configured to sense one or more conditions at a second location L2, the second location L2 being circumferentially spaced from the first location L1. In embodiments the sensor array 300 conformally attached to the component 104 can include any embodiment of sensor array (e.g., sensing system 200 and/or sensor mat 102) as described herein, and/or any suitable combination of embodiments. The load bearing component 104, if included in a landing gear system of an aircraft, or suspension of a vehicle, can be any one or more of a shock or and/or a strut and/or a support column. In certain embodiments, the component 104 need not be a landing gear component. Any component having a symmetrical profile that experiences loads can utilize the sensing system 100, 300 described herein, for example a rod or an I-beam.

Turning to FIGS. 5-8, in certain embodiments, a system 400 can be similar to that of system 100, for example system 400 can have similar components and features with respect to systems 100. For brevity, the description of common elements that have been described above for system 100 are not repeated with respect to system 400 as shown in FIGS. 1-4.

Figure 5:
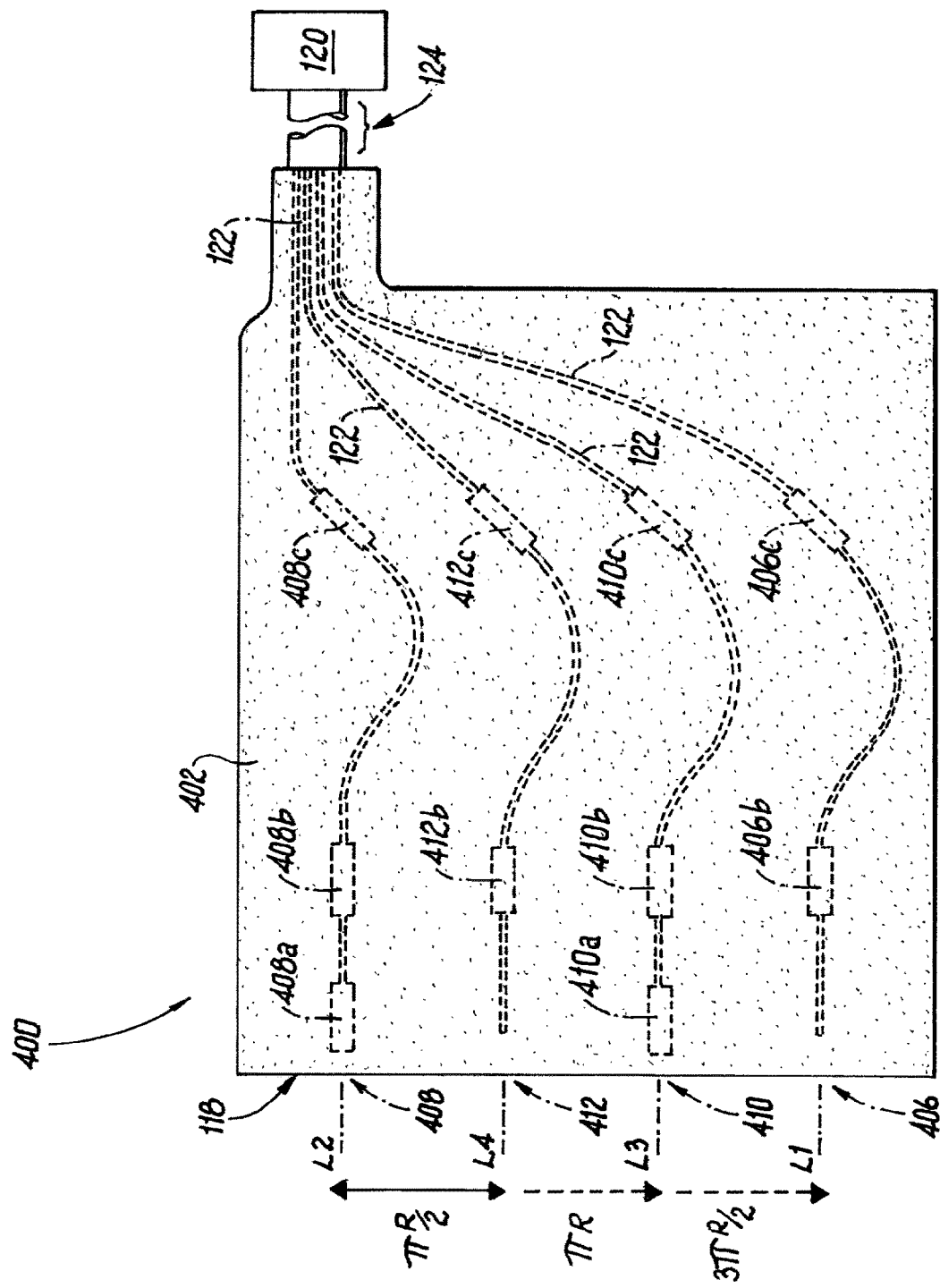
FIG. 5 is a schematic plan view of another system in accordance with this disclosure, showing another embodiment of a sensor mat having one or more sensor clusters therein or thereon.

FIG. 5 shows an embodiment of a planar layout of a sensor mat 402 using Fiber-Bragg Grating sensors. The sensor mat 402 is designed to wrap around a component 104 having a radius R for the purpose of monitoring strain in strategic locations in order to enable resolution of the force vectors acting on the component 104. Normal strain sensors 406b, 408b, 410b, 412b are arranged to maximize strain sensitivity due to forces normal to the surface (e.g. bending and axial forces) while being located at a predetermined distance from each other to enable segregation of force vectors. Shear strain sensors 406c, 408c, 410c, 412c are shown located in-line with the normal strain sensors 406b, 408b, 410b, 412b with the fiber 122 containing the sensors being at 45 degrees of in plane rotation with respect to the adjacent normal strain sensor.

The shear strain sensors 406c, 408c, 410c, 412c are shown parallel to each other in the planar representation. The normal strain sensors 406b, 408b, 410b, 412b are arranged in complimentary pairs such that when these pairs are placed at a linear distance πR apart in the sensor mat 402, they form complimentary pairs when placed on a component of radius R. Thus, in this embodiment, clusters 406 and 412 form a complimentary pair, as does 408 and 410. Similarly, the shear strain sensors 406b, 408b, 410b, 412b form complimentary pairs with each other. When the sensor mat 402 is attached and wrapped around the component 104, the complementary shear strain sensors 406c, 410c end up being 90 degrees apart with respect to each other and are used to determine the shear strain resulting from torsional forces exhibited on the component 104. Temperature sensors 408a, 410a are depicted at the end 518 of some of the clusters to provide a means of thermal calibration of the sensors, however the temperature sensor orientation, arrangement, or inclusion in the complimentary pairs is not critical and thus can be placed in any suitable location. When the sensing array 402 is subsequently attached to the component 104 (e.g., adhered in any suitable manner including epoxy), the importance of the spatial interrelationship between the normal strain sensors 406b, 408b, 410b, 412b and the shear strain sensors 406c, 408c, 410c, 412c will be readily apparent to those skilled in the art. An axial view of the relationship of complementary pairs of normal and shear strain sensors is shown below.

Figure 6:
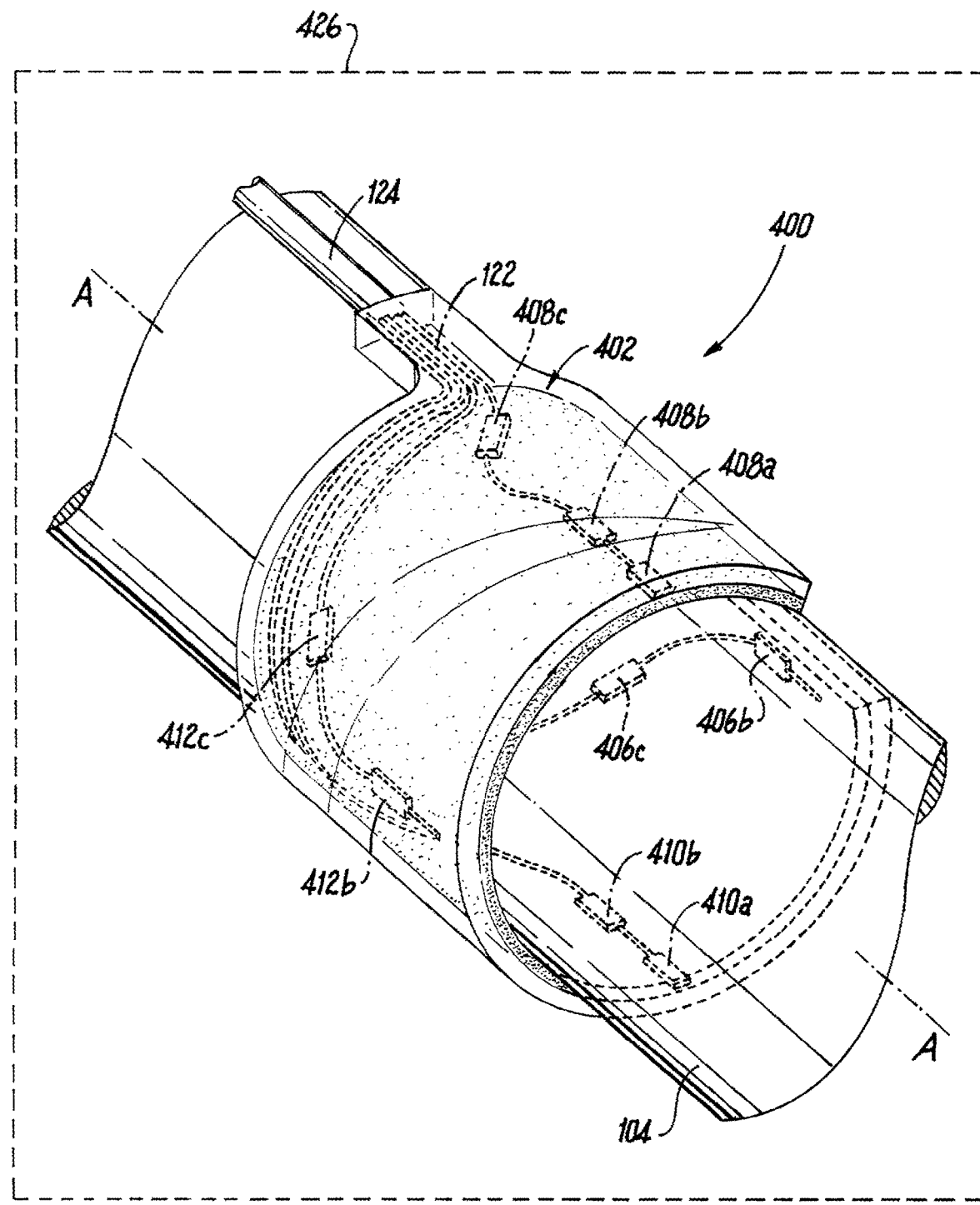
FIG. 6 is a perspective view of the system of FIG. 5, showing the sensor mat conformally attached to a component.
Figure 7:
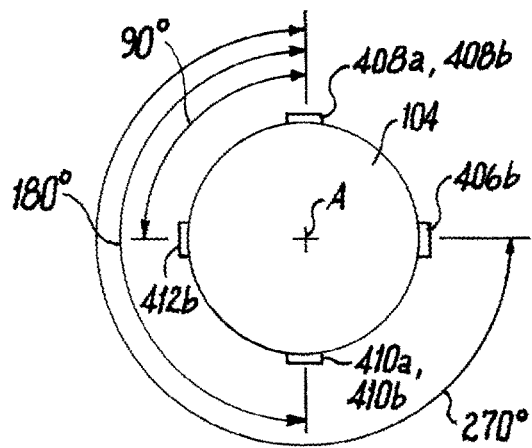
FIG. 7 is a schematic axial view of the component showing the spatial interrelationship of sensors on or in the sensor mat, with the sensor mat removed for clarity.
Figure 8:
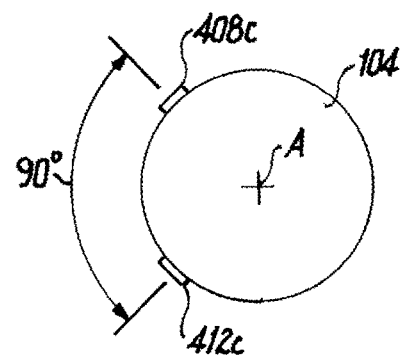
FIG. 8 is a schematic axial view of the component showing the spatial interrelationship of sensors on or in the sensor mat, with the sensor mat removed for clarity.

The sensor mat 402 can include four sensors clusters 406, 408, 410, 412, at locations L1-L4. The sensor mat 402 can be configured to conformally attach to the component 104 as shown in FIG. 6, where the sensors clusters 406, 408, 410, 412 are prearranged in the mat 402 so that when attached to the component 104, clusters 406 and 412 are diametrically opposed and clusters 408 and 410 are diametrically opposed, as described above. As can be seen more clearly in FIGS. 6-8, when viewing the component 104 axially with the sensor mat 402 attached, the sensor clusters 406 and 412 are separated from one another by 180 degrees, and the clusters 408 and 410 are separated from one another by 180 degrees. Clusters 410 and 412 can be disposed midway (e.g., 90 degrees) between clusters 406 and 408. In FIG. 7, only those sensors that are axially aligned with the central axis of the sensor mat 402 are shown, and those sensors that are obliquely offset from the central axis are shown in FIG. 8. However, this is shown for clarity purpose only and it should be understood by those having ordinary skill in the art that in actuality, both the axially aligned sensors and the obliquely offset sensors will be seen when viewing the component along the central axis, where the offset sensors are positioned 45 degrees between the clusters 406 and 410, and 408 and 412, but 90 degrees from one another.

Figure 11:
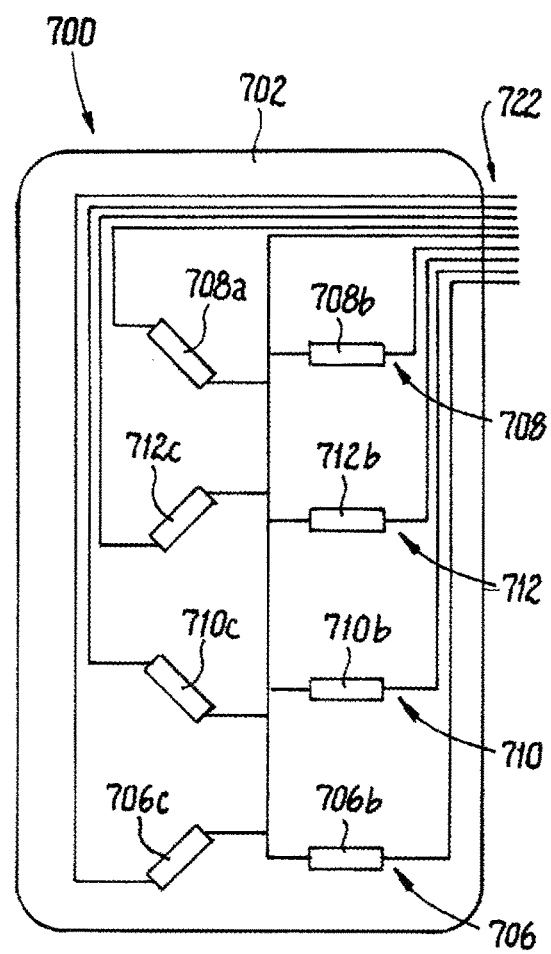
FIG. 11 is a schematic plan view of another system in accordance with this disclosure, showing another embodiment of a sensor mat having one or more sensor clusters therein or thereon.

When a force is applied to the component 104 which causes a bending moment that generates a strain, one sensor of the normal strain complementary pair will be in compression while the other sensor is in tension (e.g. 406b in tension and 412b compression). For the case where the bending moment is in-line with the complementary pair, the strain generated will be equal and opposite, such that $\sigma_{A1} = -\sigma_{A2}$. Using complimentary pairs can be used to eliminate the sensed strain due to the bending component in order to isolate other strain contributions for the resolution of constituent force vectors. For the shear strain sensor complimentary pairs (e.g. 406c: 410c, 408c: 412c, 410c: 412c), the object is to obtain the strain resultant from the subjugation of torsional forces acting upon the component 104. This can be similar to foil strain gage rosettes (e.g., as shown in FIG. 11). As such, the axial angle offset from the central axis of the mat 402 could potentially be different than 90 degrees (e.g. 60 degrees or 45 degrees). In embodiments, only one shear strain sensor complimentary pair can be used (e.g. $C_1:C_2$). Embodiments having more than one complimentary pair can provide a means of redundancy and capability to average shear strain from complimentary pairs. However, if such redundancy is not desired for a given application, the redundant complimentary pairs may be omitted.

Figure 9:
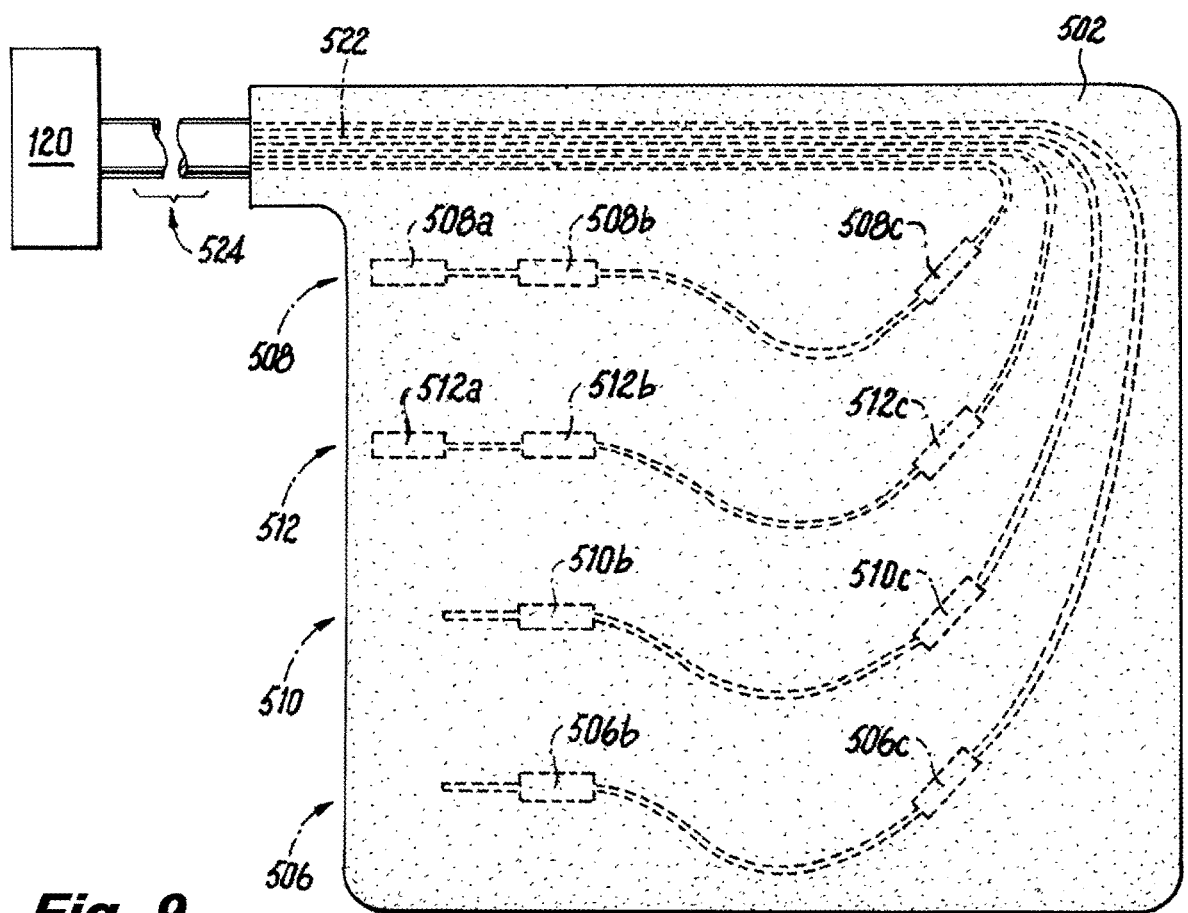
FIG. 9 is a schematic plan view of another system in accordance with this disclosure, showing another embodiment of a sensor mat having one or more sensor clusters therein or thereon.

Turning to FIG. 9, in certain embodiments, a system 500 can be similar to that of system 400, for example system 500 can have similar components and features with respect to systems 400. For brevity, the description of common elements that have been described above for system 400 are not repeated with respect to system 500 as shown in FIG. 9. In system 500, the ingress/egress of the optical fibers 122 can originate on the same side as the terminal edge 118 of the sensor mat 502. In this case, the distribution and arrangement of the temperature sensors can be different than in sensor mat 102 or 402. Placing the ingress/egress of the optical fibers 122 in this orientation can allow for a reduction of width of the sensor may 502 since the strain relief sheath and connector 524 can be inset without interference from the fiber runs.

Figure 10:
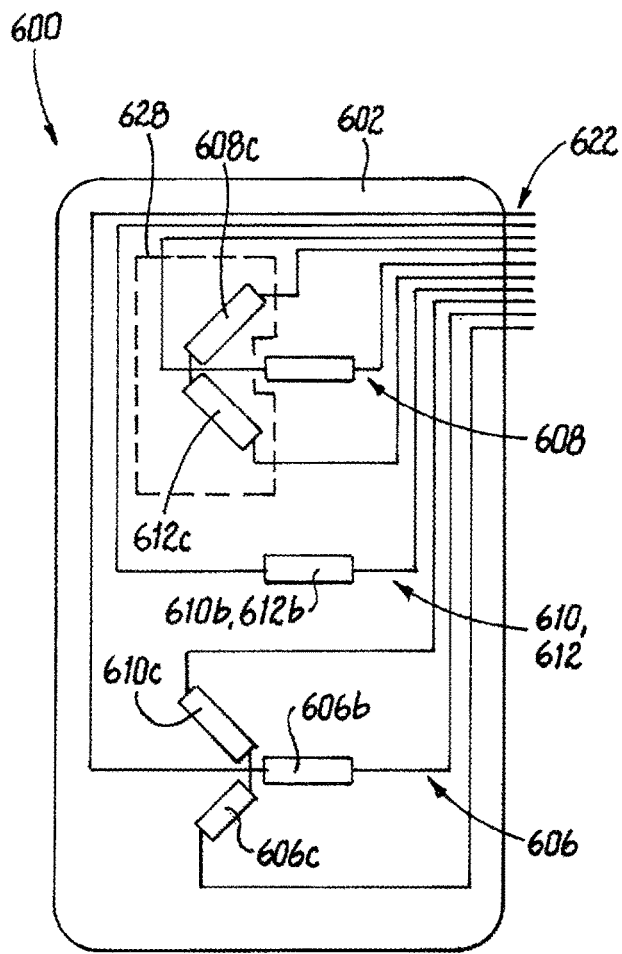
FIG. 10 is a schematic plan view of another system in accordance with this disclosure, showing another embodiment of a sensor mat having one or more sensor clusters therein or thereon.

Turning to FIG. 10, in certain embodiments, a system 600 can be similar to that of system 400, for example system 600 can have similar components and features with respect to systems 400. For brevity, the description of common elements that have been described above for system 400 are not repeated with respect to system 600 as shown in FIG. 10. In system 600, the sensors can include one or more of foil strain gauges and/or carbon nanotube strain gauges, where optical fibers 122 are replaced by traditional wiring. Here, strain rosettes 628 are combined with axial sensors on the sensor mat 602 to provide coverage for both the normal and shear strain contributions when the sensor mat is wrapped around the component 104. The strain rosettes 628 can be formed from strain sensors 606c, 608c, 610c, 612c.

The routing of the conductor egress with foil or carbon nanotube gauges can be simpler than for the optical fibers 122 of the Fiber-Bragg Grating sensors, since there is not a concern regarding minimum bend radius. In embodiments, the strain gauges can be electrically isolated from each other or share grounding as in the rosette configuration shown. If using carbon nanotube gauges, the sensors can be included in the third substrate 117 with conductor ingress/egress in or above the third substrate 117, or even above the first and second substrates 113, 115. In system 600, temperature sensors are not shown, but can be added at discretion for thermal compensation of strain for a given application if needed.

Turning to FIG. 11, in certain embodiments, a system 700 can be similar to that of system 600, for example system 700 can have similar components and features with respect to systems 600. For brevity, the description of common elements that have been described above for system 600 are not repeated with respect to system 700 as shown in FIG. 11. In the system 700, the sensor mat 702 can include an alternate configuration for a planar mat 702 for use with carbon nanotube strain gauges. Because carbon nanotube sensors are typically planar sheet form, it may be desirable to combine them with flexible conductor sheets in a polymer (e.g. polyimide) to minimize the mat thickness and improve reliability over traditional wiring.

Embodiments include multiple strain sensors in multiple locations to achieve higher resolution strain determinations on a component under load. As used herein, strain can include any one or more of linear strain, bending strain, torsional strain, shear strain, and/or compression, for example. At least one sensor is parallel to the axis of the component to measure linear and bending forces, or axial strains, and at least one sensor is 45 degrees oblique to the axis to measure rotational, torsional, or shear forces. Placing the strain sensors in these locations allows for other forces acting on the component to be factored out if not needed for health determination. For example, in certain applications, bending moments can be factored out.

Including the sensors in the prearranged sensor mat as provided herein, when an installer installs the sensor array to the component, the mat is wrapped around the component like bracelet, where each sensor is aligned in its proper location relative to the component and to the surrounding sensors. This removes any guess work as to where the installer needs to place the sensors to achieve accurate measurements. Moreover, the prearranged system allows for accurate measurements and calculations even if the even the mat is not installed perfectly square on the component, because the sensors will remain orthogonal to one another.

While the sensors described herein are described as shear strain and normal strain sensors, the sensors themselves may be the same or similar, but may measure different strains depending on where the sensors are placed on the component, how they are oriented relative to the axis of the component, and where the sensors are placed relative to one another.

The arrangement of the sensors on or in the sensor mat can allow for additional redundancy, as well as allowing for measurements not reliant on the bending moments of the component to facilitate the resolution of force vectors. The array includes multiple opposing redundancies.

In embodiments, the sensing system can include a fiber-Bragg grating (FBG) sensing array and methodology that enables FBG sensing elements adhered to a cylinder to resolve complex force vectors for the purposes of determining vehicle loading and center of gravity. Additional sensor types may be included as needed or desired, for example foil or carbon nanotube strain gauges. The design features of the array provide a means for collecting both the normal and shear stress vectors on a cylinder (e.g. shock, strut, etc.) in a single patch sensing array with multiple fiber elements to enable segregation of the stress vectors due to axial forces, shear forces, bending moments, and torsional moments of the component. Embodiments include a FBG bracelet sensor providing an easy means of adhering a complex sensing array to the surface of a component while ensuring that the sensing elements are in the proper locations to resolve the desired force vectors.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A sensor mat, comprising:
   a first substrate configured to wrap about a component to which the sensor mat is configured to attach, the component extending about a central axis and the first substrate having a length extending along a horizontal axis from a first end to a second end;
   a plurality of sensors disposed on or within the first substrate at predetermined locations and configured to sense one or more forces acting on the component to which the sensor mat is configured to attach,
   wherein the predetermined locations are based on a geometry of the component to which the sensor mat is configured to attach;
   and
   wherein the horizontal axis of the first substrate is configured to extend parallel to the central axis of the component when the sensor mat is attached to the component; and
   wherein the plurality of sensors are arranged in two or more sensor clusters and wherein the two or more sensor clusters are arranged in complimentary pairs disposed at locations defined relative to one another based on the geometry of the component.

2. The sensor mat of claim 1, wherein at least one sensor in each complimentary pair is axially aligned with the horizontal axis of the sensor mat.

3. The sensor mat of claim 1, wherein at least one sensor in each complimentary pair is arranged oblique to the horizontal axis of the sensor mat.

4. The sensor mat of claim 1, wherein the plurality of sensors include Fiber-Bragg Grating sensors configured to sense one or more of shear strain, normal strain, and/or temperature.

5. The sensor mat of claim 1, wherein the plurality of sensors include foil strain sensors.

6. The sensor mat of claim 1, wherein the plurality of sensors include carbon nanotube strain sensors.

7. The sensor mat of claim 1, wherein the sensor mat further includes a second substrate and a third substrate configured to sandwich the first substrate.

8. A system comprising:
   a load bearing component; and
   the sensor mat of claim 1 conformally attached to the component.

9. The system of claim 8, wherein at least one sensor of each complimentary pair is axially aligned with a central axis of the component, wherein a first sensor cluster of the complimentary pair is spaced 180 degrees from a second cluster of the complimentary pair in the circumferential direction.

10. The system of claim 8, wherein at least one sensor of each complimentary pair is obliquely offset from a central axis of the component, wherein a first sensor cluster of the complimentary pair is spaced 90 degrees from a second cluster of the complimentary pair in the circumferential direction.

11. The system of claim 8, wherein at least one sensor of each sensor cluster is oriented oblique to a central axis of the load bearing component.

12. The system of claim 8, wherein the load bearing component is an aircraft landing gear component.

13. The system of claim 12, wherein the landing gear component is a shock, a strut, rod, beam or support column.

14. The system of claim 8, wherein the load bearing component is symmetrical about at least a longitudinal axis of the load bearing component.

15. The sensor mat of claim 1, wherein the complimentary pairs are disposed at a linear distance $\pi R$ or $\frac{1}{2}\pi R$ on the first substrate, wherein R is a radius of the component.

16. A method for installing a sensing system, comprising:
- selecting a sensor mat based on a geometry of a load bearing component, the component having a central axis;
- applying the sensor mat conformally around the component, the sensor mat comprising:
  - a first substrate; and
  - a plurality of sensors disposed on or within the first substrate and configured to sense one or more forces acting on the component;
  - wherein the plurality of sensors are arranged in two or more sensor clusters and wherein the two or more sensor clusters are arranged in complimentary pairs circumferentially spaced from one another about the central axis of the component; and
  - wherein the sensor mat is applied to the component such that portions of the substrate on or within which the plurality of sensors are disposed do not overlap.

17. The method of claim 16, wherein applying the sensor mat includes applying the first substrate via a transfer sheet, wherein the first substrate remains attached to the component upon removal of the transfer sheet.

18. The method of claim 16, wherein the complimentary pairs are circumferentially spaced 90 degrees or 180 degrees.

19. The method of claim 16, wherein at least one sensor in each complimentary pair is axially aligned with the central axis of the component.

20. The method of claim 16, wherein at least one sensor in each complimentary pair is arranged oblique to the central axis of the component.

* * * * *